Nov. 2, 1965  J. W. RIEKE  3,215,925

VOLTAGE REGULATOR

Filed Oct. 20, 1961

INVENTOR
J. W. RIEKE
BY
Ralph P. Holcomb
ATTORNEY

United States Patent Office 3,215,925
Patented Nov. 2, 1965

3,215,925
VOLTAGE REGULATOR
John W. Rieke, Basking Ridge, N.J., assignor to Bell Telephone Laboratories, Incorporated, New York, N.Y., a corporation of New York
Filed Oct. 20, 1961, Ser. No. 146,500
2 Claims. (Cl. 323—63)

This invention relates to electrical control systems and more particularly to one for regulating the magnitude of the voltage supplied to a load from a unidirectional source.

The principal object of the invention is to regulate the output voltage supplied to a load from a source such as a battery. A more specific object is to maintain the load voltage constant during periods of fluctuation in the magnitude of the voltage of the source or the impedance of the load. Further objects are to improve the regulation and reduce the cost of voltage supplied by a battery.

Electrical systems often require a source which will supply a unidirectional voltage of constant magnitude to a load. However, when the source is a battery, the load voltage drops off as the battery discharges, and changes with the load current.

In accordance with the present invention, the load voltage is maintained substantially constant without adding cells and without using cells with an excessive ampere-hour rating. Voltage regulation is accomplished by connecting an inductor, followed by a diode, in series between the source and the load. A periodically operating switch connects the inductor directly across the source. This increases the current through the inductor and thus increases the associated magnetic field. The switch then opens. The resulting partial collapse of the field increases the voltage supplied to the load. By properly timing the switching period, the output voltage may be maintained at a selected average value within close limits. A capacitor connected in shunt with the load helps to minimize the voltage fluctuations. A voltage-error detector and a frequency generator may be added to the circuit to make the regulation automatic.

The nature of the invention and its various objects, features, and advantages will appear more fully in the following detailed description of typical embodiments illustrated in the accompanying drawing, of which:

Figure 1:
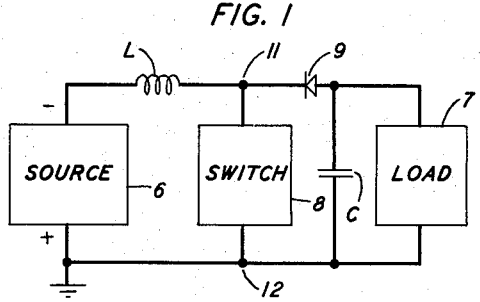
FIG. 1 is a schematic circuit of a voltage regulator in accordance with the invention.

FIG. 1 shows a source of unidirectional voltage 6 connected to a load 7 through a voltage regulator comprising an inductor of value L, a switch 8, a diode 9, and a capacitor of value C. One end of the inductor L is connected to the negative terminal of the source. The cathode of the diode 9 is connected to the other end of L and its anode to the load 7. The switch 8, with terminals 11 and 12, is connected between the last-mentioned end of L and the positive, grounded terminal of the source 6. The capacitor C shunts the load 7.

The switch 8 closes and opens periodically to connect the inductor L intermittently across the source 6. It may, for example, be a transistor or a solid-state, three-terminal PNPN rectifier. During the period $T_1$ when the switch 8 is closed, the increased current builds up the magnetic field associated with the inductor L. During the period $T_2$ when the switch is opened, the partially collapsing field increases the output voltage $E_2$ applied to the load 7 and the capacitor C. Assuming that the source 6 has the polarity shown, the diode 9, which may be of the silicon type, will not conduct current during the time $T_1$, because its cathode will be more positive than its anode. It will, however, conduct for the period $T_2$. The capacitor C supplies voltage to the load 7 during the time that the switch 8 is closed, and thus helps to smooth out the fluctuations in the output voltage.

It can be shown that the average value of the output voltage is $$E_2 = E_1(T_1+T_2)/T_2 \qquad (1)$$

where $E_1$ is the voltage of the source 6. Since $E_2$ depends upon the ratio $(T_1+T_2)/T_2$, its magnitude may be adjusted, or regulated by feedback, by controlling either $T_1$, $T_2$, or both.

The value of the inductance L is not critical but it is preferably large enough to keep the changes in the current therein acceptably small during the periods $T_1$ and $T_2$. Practically, L is limited by the allowable physical size of the inductor and the power losses which it produces.

The value of the capacitance C is made large enough to hold the ripple in the output voltage $E_2$ within acceptable limits. The ripple may be reduced by decreasing the periods $T_1$ and $T_2$. The minimum periods are determined by the maximum switching rate attainable.

Figure 2:
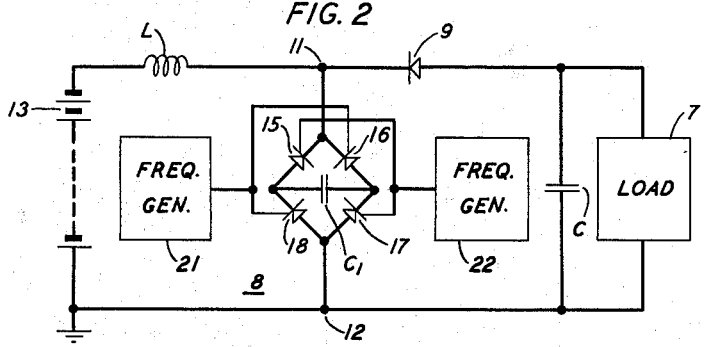
FIG. 2 is similar to FIG. 1 but shows the switch in greater detail.

FIG. 2 shows the source as a multi-cell battery 13, and shows one embodiment of the switch. The switch 8 comprises four controlled, solid-state, PNPN rectifiers 15, 16, 17, and 18, a capacitor of value $C_1$, and two frequency generators 21 and 22. The rectifiers 15, 16, 17, and 18 are connected to form a four-arm bridge, with alternate rectifiers poled oppositely. Two opposite corners of the bridge constitute the terminals 11 and 12 of the switch. The capacitor $C_1$, connected between the other two corners of the bridge, is the means for turning off the PNPN rectifiers. Each of these rectifiers has a control electrode. When a voltage pulse is applied to the control electrode, the rectifier is conditioned to transmit current in one direction only as long as the current between the other two electrodes remains above a certain holding value characteristic of the particular PNPN device. The frequency generators 21 and 22 furnish these control pulses. The generator 21 controls the rectifiers 16 and 18, and the generator 22 controls the other two rectifiers 15 and 17.

The circuit of FIG. 2 operates in the following manner. It is first assumed that all of the rectifiers 15 through 18 are in the non-conducting condition and the capacitor $C_1$ is charged approximately to $E_2$, with the right-hand terminal positive. Voltage pulses from the generator 21 are impressed upon the control electrodes of the rectifiers 16 and 18, rendering them conducting. A low-impedance path may now be traced from the positive terminal of the battery 13 through the rectifier 18, the capacitor $C_1$, the rectifier 16, and the inductor L to the negative battery terminal. Due to the battery voltage $E_1$, aided by the voltage across the capacitor $C_1$, current flows in this path to build up the magnetic field associated with the inductor L. This flow of current gradually reverses the charge on $C_1$. The capacitor loses its positive charge and becomes negatively charged to a voltage slightly larger than $E_2$. As $C_1$ charges, the voltage between the terminals 11 and 12 reaches a value equal to $E_2$ and the flow of current from L begins to transfer from the path through $C_1$ to the circuit including the diode 9, the output capacitor C, and the load 7. The current through $C_1$ falls below the holding value for the rectifiers 16 and 18 and they cease to conduct, ending the period $T_1$. During the ensuing non-conducting period $T_2$, the magnetic induction produced by the inductor L induces additional voltage which adds to the voltage $E_1$ of the battery 13. The rectifier 9 will conduct during this period to impress this augmented voltage $E_2$ upon the load 7 and the capacitor C, thus charging this capacitor to $E_2$.

At the end of the period $T_2$, voltage pulses from the generator 22 are impressed upon the rectifiers 15 and 17 to render them conducting. Now, a low-impedance path may be traced from the terminal 12 through the rectifier 17, the capacitor $C_1$, and the rectifier 15 to the terminal 11. Thus, a new period $T_1$ is started. It will be noted, however, that the capacitor $C_1$ is now reversed in the path between the terminals 11 and 12, so that its voltage is again added to the battery voltage to provide a charging voltage of approximately $E_1+E_2$ to build up the field associated with the inductor L. The capacitor $C_1$ is charged through this path until the voltage between terminals 11 and 12 again reaches a voltage slightly exceeding $E_2$ and once again current flow transfers to a path through the diode 9 to the output. The current through the rectifiers 15 and 17 then falls below the holding value and they revert to the non-conducting state. At the end of a second non-conducting period $T_2$, two charge-discharge cycles have been completed.

During each charging period $T_1$ when the load 7 is isolated from the source by the non-conducting diode 9, the capacitor C, which has been charged to $E_2$, sustains the voltage on the load and supplies current thereto.

It is seen that the function of the capacitor $C_1$ is to time each of the periods $T_1$. Other things being equal, the length of $T_1$ depends upon its capacitance. The use of two pairs of controlled rectifiers instead of one pair provides a flip-flop circuit in which the capacitor $C_1$ is turned end for end between the charge and discharge portions of each cycle. As a result, the energy stored in the capacitor in the charging part of the cycle is returned to the system during the discharging part of the cycle. Also, for a given load 7, the average current carried by each controlled rectifier is halved.

Figure 3:
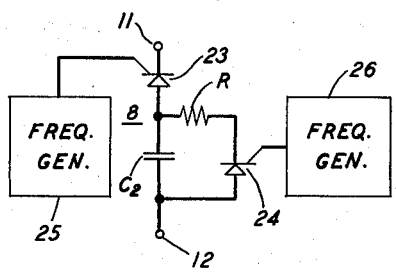
FIGS. 3 and 4 are schematic circuits of other forms of switches which may be substituted for the one shown in FIG. 2.

FIG. 3 shows a simpler switch 8 which may be substituted for the one used in FIG. 2 between the terminals 11 and 12. The simplified circuit requires only two controlled rectifiers 23 and 24, a resistor R, a capacitor $C_2$, and two frequency generators 25 and 26. The rectifier 23 and $C_2$ are connected in a series path between the terminals 11 and 12. The series combination of the rectifier 24 and R are connected in shunt with $C_2$. The generators 25 and 26 are connected, respectively, to the rectifiers 23 and 24.

The circuit of FIG. 3 operates as follows. It is assumed that the rectifiers 23 and 24 are in the non-conducting state and $C_2$ is discharged. A voltage pulse from the generator 25 is now impressed upon the control electrode of the rectifier 23 to render it conducting and start the period $T_1$. The battery voltage $E_1$ charges $C_2$ to the point that the current through the rectifier 23 falls below the holding value. The rectifier 23 becomes non-conducting, the period $T_1$ ends, and the period $T_2$ starts to run. Sometime during $T_2$, a voltage pulse from the generator 26 impressed upon the control electrode of the rectifier 24 renders it conducting. This permits $C_2$ to discharge through R until the current decays to a value below the holding current for rectifier 24. The period $T_2$ continues until another voltage pulse from the generator 25 is applied to the rectifier 23, thus starting a second charge-discharge cycle. Although the circuit of FIG. 3 requires two less rectifiers than the one shown in FIG. 2, in the former the voltage of the charged capacitor $C_2$ is not added to the charging voltage of the battery 13. Also, the energy associated with the charged capacitor $C_2$ is dissipated in the resistor R every cycle, instead of being converted into useful output power.

Figure 4:
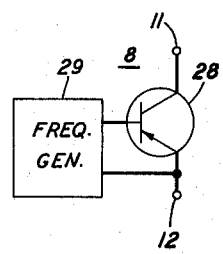

FIG. 4 shows another switch 8 which may be substituted for the one shown in FIG. 2. The circuit comprises only a transistor 28 and a frequency generator 29 producing rectangular voltage pulses. The collector of the transistor 28 is connected to the switch terminal 11, and the emitter to the terminal 12. The output of the generator 29 is applied between the emitter and the base of the transistor 28. The transistor 28 will provide a transmission path between the terminals 11 and 12 during the times that voltage pulses from the generator 29 are applied thereto. Each pulse persists for a time $T_1$ coinciding with the desired charging period. The time between successive pulses is fixed by the desired discharging period $T_2$.

Figure 5:
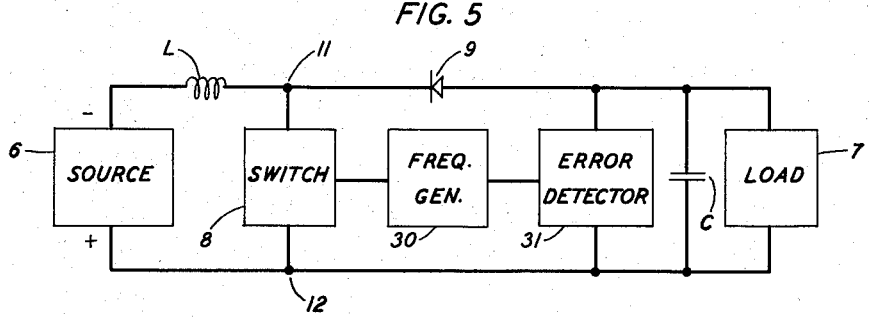
FIG. 5 is a schematic circuit of an automatic voltage regulator in accordance with the invention.

In each of the circuits shown in FIGS. 2, 3, and 4, the average value of the output voltage $E_2$ depends upon the frequency of the generator. Therefore, the circuit may be made self-regulating if this frequency is properly controlled. FIG. 5 shows such an automatic voltage regulator which is similar to the one shown in FIG. 1 except that a frequency generator 30 and an error detector 31 have been added. The function of the detector 31, connected between the diode 9 and the load 7, is to determine the plus or minus error in the voltage $E_2$ applied to the load. This error voltage is applied to the generator 30 to regulate the frequency of the voltage pulses which, in turn, are applied to the switch 8 to determine the switching rate. If the error is plus, the frequency is slowed, thus reducing $E_2$. If the error is minus the frequency is increased to raise $E_2$. Regulation is thus provided for changes in either the source voltage $E_1$ or the load current. An embodiment of this circuit was designed for a 20-ampere load current, an output voltage $E_2$ of 52 volts, and a variation of the battery voltage $E_1$ from 45 to 52 volts. The over-all voltage regulation was ±2% with an efficiency of 85%.

It is to be understood that the above-described arrangements are only illustrative of the application of the principles of the invention. Numerous other arrangements may be devised by those skilled in the art without departing from the spirit and scope of the invention.

What is claimed is:

1. A voltage step-up circuit comprising a source of direct potential, a load, an inductor connected between said source of potential and said load to intermittently deliver a potential having a magnitude larger than that of said source to said load, a capacitor, and switching means connecting said capacitor intermittently across said source and said inductor to transfer at least a portion of the potential stored in said capacitor to said inductor, said potential transfer intervals being alternate to the intervals that said inductor delivers a potential in excess of said source potential to said load.

2. A voltage step-up circuit comprising a source of potential, a load, and first and second energy storage devices, means serially connecting said first energy storage device between said source and said load to step-up the potential across said load by intermittently delivering the sum of the potential of said source and the potential stored in said first energy storage device to said load, and means serially connecting said second energy storage device with said source and said first energy storage device to intermittently transfer at least a portion of the energy stored in said second energy storage device to said first energy storage device whereby load potentials in excess of source potentials may be further extended.

References Cited by the Examiner

UNITED STATES PATENTS

| | | | |
|---|---|---|---|
| 2,555,305 | 6/51 | Alty | 321—15 X |
| 2,791,739 | 5/57 | Light | 321—2 |
| 2,817,803 | 12/57 | Hileman | 321—2 |
| 2,820,941 | 1/58 | Berkery | 321—18 |
| 3,029,386 | 4/62 | Ricker | 324—87 |
| 3,106,667 | 10/63 | Winchel | 317—148.5 |

FOREIGN PATENTS 618,624  2/49  Great Britain.

LLOYD McCOLLUM, *Primary Examiner.*